3,191,178
DEVICE FOR MULTIPLE RECORDING OF COLORIMETRIC VALUES
Arnošt Anscherlik, 5 Revoluční, Prague, Czechoslovakia
Filed Oct. 2, 1962, Ser. No. 227,792
Claims priority, application Czechoslovakia, Oct. 10, 1961, 6,022/61
5 Claims. (Cl. 346—33)

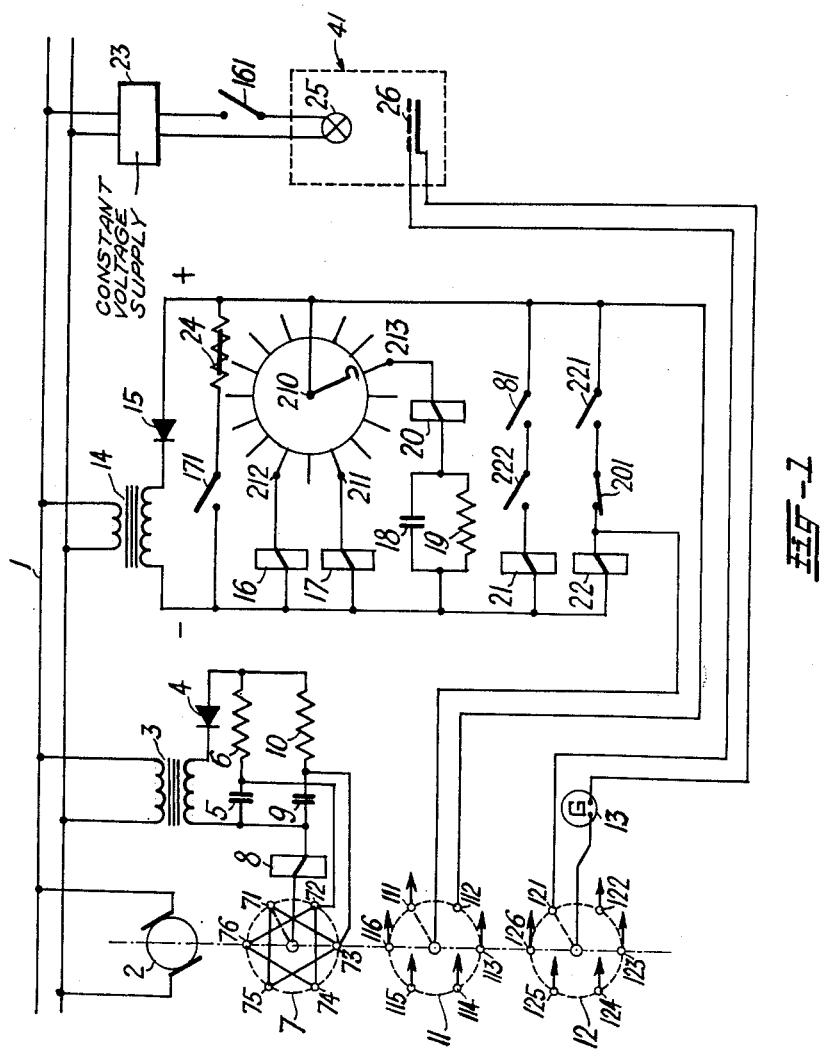

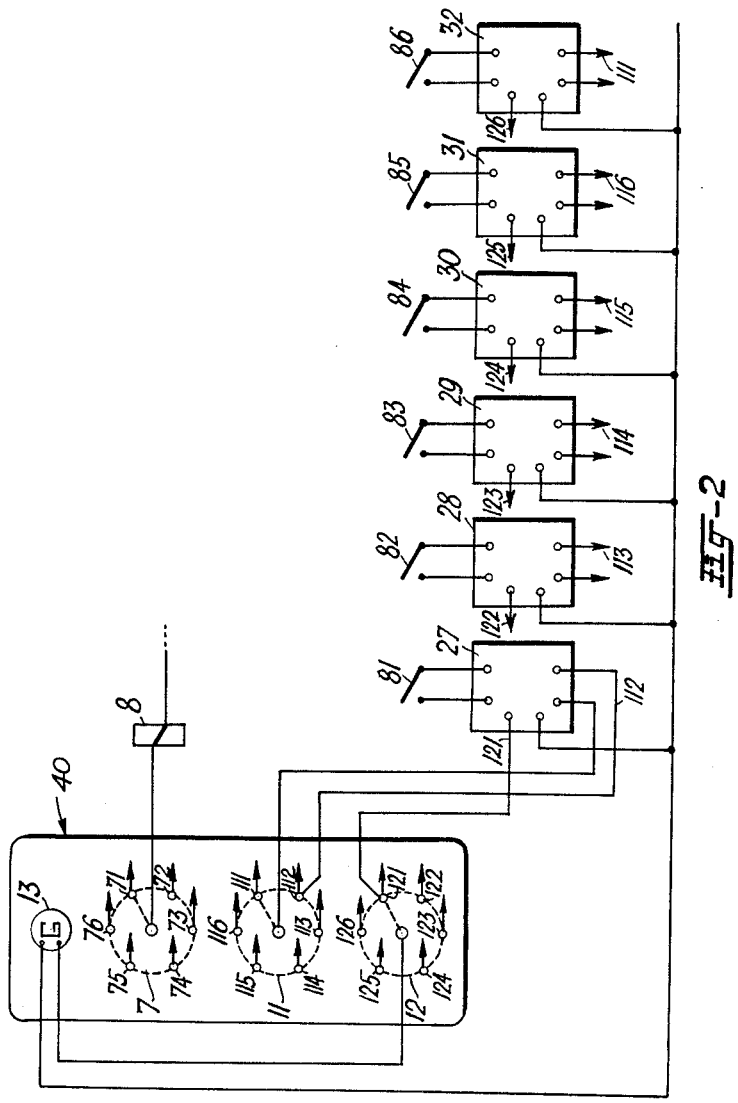

The invention relates to the recording of the results obtained on a plurality of automatic chemical analyzers, and more particularly to the recording of such results on a single recording instrument.

The operation of many plants require periodical checking the chemical composition of process materials. It is known to use automatic chemical analyzers for measuring the residual hardness or silicon content of water, and many other chemical properties.

In order to save space on central control panels, it is desirable to record the results of several analyzers on a single recorder. When the automatic analytical apparatus employed operates discontinuously, synchronization of the analyzers with the common recorder causes considerable difficulties. In some known colorimeters, the measuring cell is not completely drained nor rinsed, but a fresh sample is added to one already analyzed while the latter is being discharged from the cells and light is passed through the colorimeter cell in order to avoid critical timing. This causes an increased time lag between the taking of the sample and the recording of the corresponding analysis result and lower accuracy because the measuring cycles are of unequal length.

The present invention overcomes the shortcomings of the known devices and permits multiple recording of the results of several discontinuously operating analyzers by a single recorder by synchronizing the operating cycles of the analyzers with the drive of the recorder. The recordings are thereby taken exactly at their appropriate time without any interference with the operation of the analyzer.

The analyzers are controlled directly by the recorder drive and are stopped after taking each measurement. For this purpose, three rotary distributor switches are mechanically coupled with the recorder drive. When contacts of the distributor switches are successively closed the individual analyzers are operated and the analysis values are recorded in timed sequence.

The exact nature of this invention as well as other objects and advantages thereof will be readily apparent from consideration of the following specification relating to the annexed drawing in which:

FIG. 1 shows a portion of a preferred embodiment of the invention in diagram; and FIG. 2 is a diagram of the apparatus partly illustrated in FIG. 1, but omitting certain detail features better seen in FIG. 1.

Referring now to the drawing in detail, and initially to FIG. 2, there is seen a single recorder unit 40 connected to six colorimetric analyzer or measuring units 27 to 32 by conductors partly indicated by arrows. The recorder unit includes a single galvanometer 13 and three rotary distributor switches 7, 11, 12. Each switch has six circumferential contacts which are uniformly spaced about the switch axis. Switch 7 has the contacts 71–76, switch 11 the contacts 111–116, and switch 12 the contacts 121–126. The circumferential contacts 71, 111, 121 are simultaneously connected with the respective central contacts, and the other contacts are correspondingly aligned.

The central contact of the switch 7 is connected to the coil of a pulse relay 8 whose six normally-open contacts 81 to 86 are respective circuit elements of the six analyzer units. Terminals of these units are connected to the switches 11 and 12, and to the galvanometer 13 as will presently become apparent.

FIG. 1 shows in more detail the cooperation of the recorder unit with the analyzer unit 27 which includes the pulse relay contact 81 in its circuit. The common power source of the several units is an alternating current line 1. The synchronous drive motor 2 of the recorder is connected to the line 1 and is mechanically connected to the three rotary distributor switches 7, 11, 12. A transformer 3 provides current for the pulse relay 8 and associated elements, a transformer 14 is provided for the control portion of each analyzer unit, and a constant voltage supply 23 may be common to the several analyzer units. The transformers 3, 14 and the constant voltage supply 23 are connected to the line 1.

The secondary winding of the transformer 3 is arranged in series circuit with a half-wave rectifier 4 to feed intermittent direct current to a capacitor 5 in series with a resistor 6, and to a capacitor 9 in series with a resistor 10. Respective first terminals of the capacitors 5, 9 are connected to the distributor switch contacts 72, 73, and the second capacitor terminals are jointly connected to the central contact of the switch 7 through the winding of the pulse relay 8. The switch contacts 71, 73, 75 are conductively connected, and so are the switch contacts 72, 74, 76.

The circuit elements energized by the transformer 3 constitute a pulse generating unit when the motor 2 rotates. In the specific embodiment illustrated, the motor 2 rotates at such speed that alternating charging and discharge of the capacitors 5, 9 through the relay 8 causes the relay to attract its armature once every 20 seconds, and thereby briefly to close the contacts 81 to 86 of which only the contact 81 is visible in FIG. 1.

The secondary winding of the transformer 14 is arranged in series with a half-wave rectifier 15 to provide a direct current supply for several branch circuits. The coil of a starting relay 22, a normally closed contact 201 of a terminating relay 20, and a normally open holding contact 221 of the relay 22 constitute one series branch circuit. The central contact and the circumferential contact 112 of the rotary distributing switch 12 are shunted across the relay contacts 201 and 221.

A second branch circuit includes, in series, the coil of a magnet 21 which actuates a rotary stepping switch 210, a normally open starting contact 222 of the aforementioned starting relay 22, and the normally open contact 81 of the pulse relay 8. The stepping switch 210 is the program source of the analyzer unit as will presently become apparent.

The rotary stepping switch 210 has circumferential contacts 211, 212, 213 which are spaced apart two steps, ten steps, and four steps. With the contact 211, the switch 210 closes a branch circuit through a relay 17. A branch circuit through a light relay 16 is closed through the contact 212, and the contact 213 is arranged in series branch circuit with the coil of the aforementioned terminating relay 20 and with an RC circuit consisting of a capacitor 18 and a resistor 19.

Ultimately, a normally open contact 171 of the aforementioned relay 17 and a solenoid actuator 24 constitute an additional series branch circuit.

The constant voltage supply 23 feeds the lamp 25 of a colorimeter 41 through the normally open contact 161 of the light relay 16. The photoelectric cell 26 of the colorimeter is arranged in circuit with the galvanometer 13 of the recorder through the contact 121 of the rotary selector switch 12. The corresponding photoelectric cells of the other analyzer units are connected to the contacts 122 to 126 in a manner evident from FIG. 2.

and the starting relays of these units are connected to the contacts 113 to 111 of the distributor switch 11, as also seen in FIG. 2.

The recorder chart and its driving connection to the motor 2 have not been illustrated in the drawing, since such features of recorders are well known and may be entirely conventional, nor has the stylus positioned by the galvanometer and the printing mechanism been illustrated, since they are not in themselves relevant to this invention. Similarly, the cell of the colorimeter 41 has been omitted from the drawing. The supply lines for samples and reagents, and the drain lines for the colorimeter cells are illustrated only by the solenoid actuator 24.

The aforedescribed apparatus is operated in the following manner:

In the illustrated position of the distributor switch 11 the contact 112 is disconnected from the central contact of the switch. As the motor 2 revolves, the contact 112 is closed and the starting relay 22 is switched on since the terminating relay 20 is deenergized and its contact 201 is closed. The relay 22 closes its holding contact 221 which keeps the relay energized even after the contact 112 is disconnected. The relay 22 closes its starting contact 222. Upon the next closing of the contact 81 of the pulse relay 8, the electromagnet 21 of the stepping switch 210 is actuated. When the contact 211 of the switch 210 is closed thereby, the relay 17 closes its contact 171, thus energizing the solenoid actuator 24 which causes draining of a sample from the cell of the colorimeter and the influx of a fresh sample and of the required doses of reagents to the measuring cell of the colorimeter 41.

After a period sufficient for draining, rinsing and refilling of the measuring cell with a mixture of sample and reagent (or reagents), the contact 212 of the stepping switch 210 is closed, thereby energizing the relay 16, which closes its contact 161 and provides current from the constant voltage supply 23 to the lamp 25 of the colorimeter 41.

Since the rotary distributor switches 7, 11, 12 are mechanically linked and jointly driven by the electromotor 2, the distributor switch 12 is in a position in which the contact 121 is closed when the lamp 25 of the colorimeter is lit. The light passes through the non-illustrated measuring cell, and falls on the photoelectric cell 26. The current signal thus generated reaches the galvanometer 13 through the contact 121 of the distributor switch 12. After the measured light has been recorded from the signal indicating position of the galvanometer, the contact 213 of the stepping switch 210 is closed, whereby the capacitor 18 is charged, and the terminating relay 20 is momentarily switched on. The contact 201 is thereby opened, the starting relay 22 is deenergized, its contact 222 is disconnected, and the supply of current to the electromagnet 21 of stepping switch 210 is interrupted. The resistor 19 permits slow discharge of the capacitor 18, while the stepping switch 210 remains in the position in which the contacts 213 are closed, until the starting relay 22 is again energized when the contact 112 of the distributor switch 11 is closed. It will be understood that the analyzers 27 to 32 are started in sequence and that the analysis results are registered by the galvanometer 13 of the common recorder.

As the timing of the analyzers is uniform, the values recorded in a given position of the recorder are always those determined by the appropriate analyzer. If the operating program of one of the analyzers is interrupted for any reason, the results of this analyzer will always appear in the same sequence on the record as soon as the analyzer is re-started by the distributor switch 11.

In the device according to the present invention, a single recorder thus can register values measured by several discontinuously operating analyzers without interfering with their operation.

What I claim is:

1. In an arrangement for indicating multiple measured values, in combination:
   (a) recorder drive means and indicating means;
   (b) pulse generating means operatively connected to said drive means for generating a sequence of pulses when said drive means operates;
   (c) a plurality of measuring units, each unit including measuring means, a program source responsive to said pulses for operating said measuring means, and signal generating means for generating an electrical signal in response to a measurement made by said measuring means;
   (d) first switch means operatively connected to said drive means fore sequentially connecting said program sources to said pulse generator means when said drive means operates; and
   (e) second switch means operatively connected to said drive means for sequentially connecting said signal generating means to said indicating means for sequential indication of said signals of said signal generating means by said indicating means.

2. In an arrangement as set forth in claim 1, said pulse generating means including third switch means operatively connected to said drive means.

3. In an arrangement as set forth in claim 2, said first, second, and third switch means being connected to said drive means for joint movement thereby.

4. In an arrangement as set forth in claim 1, said program sources each including stepping switch means, and actuating means responsive to said pulses for moving said stepping switch means by one step in response to each of said pulses.

5. In an arrangement as set forth in claim 1, said indicating means including galvanometer means, and said signal generating means each including a photoelectric cell in circuit with said galvanometer means when said signal generating means is connected to said indicating means by said second switch means.

References Cited by the Examiner
UNITED STATES PATENTS

| | | | |
|---|---|---|---|
| 1,894,132 | 1/33 | Stone | 346—33 X |
| 2,960,910 | 11/60 | Pelavin | 88—14 |
| 3,020,793 | 2/62 | Neubrech et al. | 346—33 X |
| 3,059,524 | 10/62 | Grassman et al. | 346—33 X |

LEO SMILOW, *Primary Examiner.*